United States Patent
Sauder et al.

[15] 3,706,870
[45] Dec. 19, 1972

[54] METHOD AND APPARATUS FOR STUD WELDING

[72] Inventors: Robert A. Sauder; Gary R. Kendrick, both of Emporia, Kans.

[73] Assignee: Sauder Industries, Inc., Emporia, Kans.

[22] Filed: June 28, 1971

[21] Appl. No.: 157,432

[52] U.S. Cl. ................................... 219/98, 219/99
[51] Int. Cl. ..................... B23k 9/20, B23k 11/14
[58] Field of Search ............................ 219/98, 99

[56] References Cited

UNITED STATES PATENTS

| | | | |
|---|---|---|---|
| 2,447,113 | 8/1948 | Candy | 219/98 |
| 2,829,235 | 4/1958 | Van Den Blink et al. | 219/99 |
| 3,021,418 | 2/1962 | Van Den Blink et al. | 219/99 |
| 2,638,525 | 5/1953 | Candy | 219/99 |
| 2,962,578 | 11/1960 | De La Rosa | 219/98 |

*Primary Examiner*—R. F. Staubly
*Attorney*—William S. Dorman

[57] ABSTRACT

Method and apparatus for stud welding which includes an electrically conductive metallic stud having a head at one end thereof and a stud tip of reduced diameter at the other end. The stud is positioned against a metallic object to which the stud is to be welded by contacting the tip of reduced cross section directly against the metallic object. A circular ceramic arc shield surrounds the tip of the stud. Immediately above the arc shield, the stud shank is provided with a peripheral groove and a fusible retaining ring is mounted on the stud with a plurality of inwardly directed fingers on the retaining ring being received in the groove. A stud gun is placed against the head of the stud and a manual force is applied in the direction of the metallic object, and, simultaneously, a current of predetermined duration is passed through the stud and into the metallic object. The stud tip, because of its relatively small cross section, burns away and starts an arc. The stud itself does not move at this time because the retaining ring, resting against the arc shield, prevents movement of the stud towards the metallic object. However, as the current continues for a brief period of time and the heat increases, the fingers of the retaining ring will burn away and melt thus allowing the stud to plunge into the molten metal formed by the arc.

5 Claims, 5 Drawing Figures

PATENTED DEC 19 1972 3,706,870

ROBERT A. SAUDER
GARY R. KENDRICK

INVENTORS

BY
*William S. Dorman*
ATTORNEY

METHOD AND APPARATUS FOR STUD WELDING

The present invention relates to an improved method and apparatus for stud welding. More particularly, the present method and apparatus for stud welding involves the continuous application of a unidirectional force against the stud during the welding operation.

The methods and apparatus heretofore employed for stud welding are well known. Generally speaking, the prior art teaches the desirability of retracting the stud slightly away from the surface of the metallic object to which the stud is to be welded, so as to initiate an arc; thereafter, the stud can be forced into the molten metal created by the arc. However, the quality of the weld is generally dependent upon the strength and duration of the arc created which, in turn, involves the distance through which the stud is retracted and the time involved in its return.

The present invention involves a method and apparatus which eliminates the necessity of retracting the stud before initiating the welding operation. By using a stud which has a stud tip of relatively small cross sectional area and by retaining the stud in a predetermined position for a predetermined period of time, a unidirectional force can be exerted against the stud and uniform welding results can be achieved. The stud tip of reduced cross sectional area is supported in a position where the tip is in contact with the metallic object to which the stud is to be welded. A ring-shaped arc shield surrounds the tip of the stud and bears against the metallic object. A fusible retaining ring bears against the opposite surface of the arc shield. The fusible retaining ring is provided with a plurality of radially inwardly directed fingers which are received in a suitable groove in the stud. The opposite end of the stud from the stud tip is provided with a head which is engagable by a stud gun or by an adapter which, in turn, is engageable by the stud gun. A force is directed through the stud gun and through the stud towards the metallic object and simultaneously the current of predetermined duration is caused to pass through the stud and into the metallic object.

The current causes the tip to burn away and thus start an arc. The arc does two things: First of all, it creates a pool of molten metal in the region of the tip and, secondly, it burns away the fingers on the retaining ring. Since the force of the stud gun against the stud and towards the metallic object is maintained through the entire welding operation, as soon as the fingers of the retaining ring burn away, the stud will plunge into the molten metal formed by the arc. The welding operation is now completed. HOwever, since the head on the stud is actually a threaded nut received on the threaded end of the stud, the nut can be tightened, if desired, by rotating the stud gun, or, preferably, by rotating the adapter.

Therefore, it is a principal object of the present invention to provide an improved method and apparatus for stud welding.

It is a further object of the present invention to provide an improved method and apparatus for stud welding which involves the application of a unidirectional force through the stud and towards the metallic object to which the stud is to be welded during the entire welding operation.

It is a further object of the present invention to provide a method and apparatus for stud welding wherein the portion of the stud which contacts the metallic object is of reduced cross sectional area.

It is a still further object of the present invention to provide a method and apparatus for stud welding as set forth herein wherein the stud end or stud tip of reduced cross sectional area is surrounded by an annular arc shield.

It is a further object of the present invention to provide a method and apparatus for stud welding as disclosed herein which includes a fusible retaining member which has a portion resting against the arc shield and which has another portion received within a peripheral groove in the stud.

It is yet another object of the present invention to provide a method and apparatus for stud welding as set forth herein wherein the continued application of a unidirectional force, considered in light of a current of predetermined duration, will cause the formation of a body of molten metal in the area of the tip and which will also cause the portion of the retaining member engaging the stud to melt away thereby allowing the stud to plunge into the molten metal.

Other and further objects and advantageous features of the present invention will hereinafter more fully appear in connection with a detailed description of the drawings in which.

Figure 1:
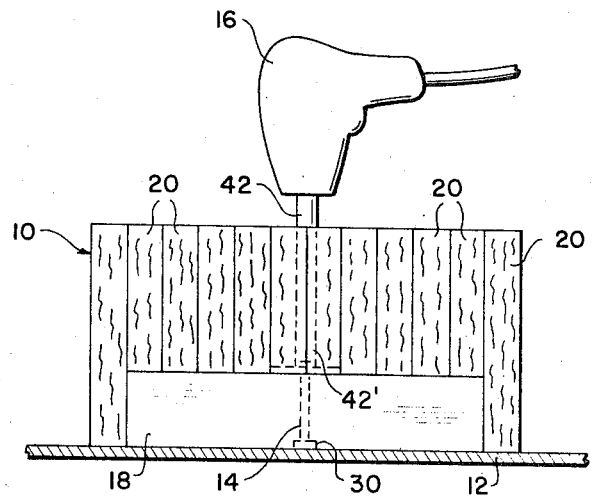
FIG. 1 is a semi-diagrammatic illustration of an apparatus for attaching a non-metallic object to a metallic object using the stud welding method and apparatus of the present invention.

Referring to the drawings in detail, FIG. 1 shows a method and apparatus for attaching a block of insulation 10 to a furnace wall 12 by means of the metallic stud 14 and the welding gun 16. The details of the insulation block 10 are not important as far as the present invention is concerned, except insofar as to illustrate the operation of the present invention in terms of a "blind" fastening. The lower portion of the insulating block 10 is composed of a substantially rectangular piece of mineral block 18 and a plurality of vertically arranged strips 20 of ceramic fiber blanket which are connected to each other and to the mineral block 18 in any convenient manner.

The stud 14 having a cylindrical shank 22 has previously been positioned within a suitable opening 24 in the mineral block 18. A threaded nut 26 is received on the upper threaded end of the stud and a washer 28 having a suitable hole therein is received on the shank 22 between the nut 26 and the upper surface of the mineral block 18. The lower end of the opening 24 merges with an enlarged opening 30 to receive an annular ceramic arc shield 32 and a retaining ring 34.

Figure 2:
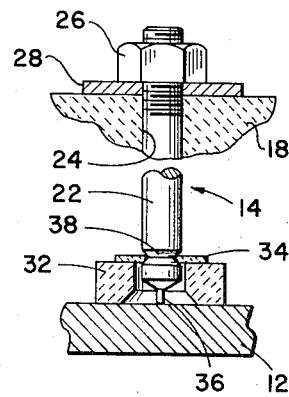
FIG. 2 is an enlarged and fragmentary detail view with certain parts in cross-section, of the stud, nut and associated structure.
Figure 5:
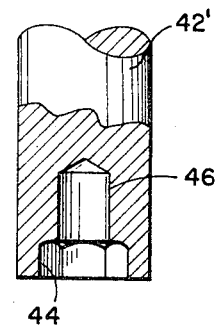
FIG. 5 is a cross sectional view, on a slightly larger scale, of the lower end of an adapter for the welding gun.

As best shown in FIG. 2, the lower end of the shank 22 is provided with a stud tip 36 of relatively smaller cross sectional area. The ring retainer 34 is retained in a groove 38 in the stud by means of a plurality of inwardly directed radial fingers 40 which project into the recess to hold the ring in position. The arc shield 32 is secured to the ring 34 by cement or in any other suitable manner.

When it is desired to weld the insulation block 10 to the furnace wall 12, a welding gun 16 is employed in such a manner that the barrel portion 42 is inserted between the central adjacent strips 20 until the lower adapter end 42' of the barrel 42 engages the nut 26 as best shown in FIG. 1. Although the latter figure would suggest that the adapter end 42' is integral with the upper barrel portion 42, it has been found in actual practice that it is preferable to have the adapter portion 42' separate from the barrel 42 in which case a conventional welding gun 16 can be employed without requiring any modification of the gun itself. Preferably, the adapter 42' would project upwardly above the strips 20 so that, after the welding operation, the gun 16 can be removed and a projecting portion of this adapter 42' can be engaged by a wrench or the like for tightening the nut 46 as will hereinafter appear.

Figure 4:
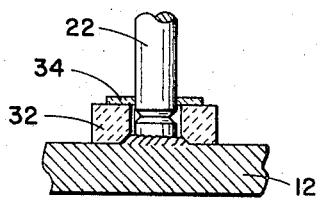
FIG. 4 is a view similar to the lower portion of FIG. 2 showing the relationship of the various parts following the welding operation.
Figure 3:
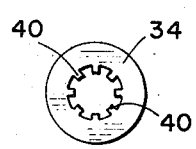
FIG. 3 is a plan view, on a slightly larger scale, of the retaining ring shown in FIG. 2.

A downward force is exerted on the handle portion of the gun 16 so that the stud is urged in a direction towards the furnace wall 12 with the stud tip 36 being substantially in engagement with the surface of the wall 12. While this manual force continues to be exerted unidirectionally, the gun is triggered and an electrical current passes through the stud 22 and into the furnace wall 12. The tip 36, because of its relatively small cross sectional area, burns away and thus starts an arc. The stud 22 does not itself move at first because it is supported by the self-locking ring retainer 34 which is retained in the groove 38 as indicated heretofore. However, as the welding operation continues for a predetermined period of time (which can be accomplished automatically or by release of the trigger) the intense heat of the arc melts away or softens the fingers 40, thus allowing the stud 22 to plunge into the molten metal formed by the arc as best shown in FIG. 4. At this point, the weld is completed and the gun can be withdrawn. It should be mentioned, however, that the ring retainer 34 and the fingers 40 thereon are carefully sized so that the fingers will melt, burn away or soften in approximately two-tenths of a second. The term "melt" as employed herein in relation to the retaining ring should be construed as covering the burning away of the fingers or merely the softening thereof to destroy the supporting or retaining function of the ring.

After the gun 16 as been disengaged from the adapter 42', it may be desirable to tighten the nut 26 on the stud 22. This can be accomplished by merely rotating the adapter 42' about its vertical axis. For this purpose, it should be noted that the lower end of the adapter 42' is provided with a hexagonal opening 44 corresponding to the size of the nut 40 and a second vertically extending opening 46 of sufficient depth to accommodate for the upper end of the bolt 22 after the nut is tightened thereon. Thereafter, the adapter 42' is withdrawn, and the resiliency of the ceramic fiber strips 20 will permit them to return to their original position, thus covering and concealing the location of the stud. In the event that the adapter portion 42' is made integral with the barrel 42 (which would involve modifying the gun 16 itself), then the nut 26 is tightened on the stud 22 prior to the withdrawal of the gun 16 by merely rotating the gun 16 about the vertical axis of the barrel 42.

Whereas the present invention has been described in terms of attachment by stud welding of a non-metallic object, namely, the insulation block, to a metallic object, obviously the present invention could be employed for the attachment of a metallic object to a metallic object. However, the stud would have to be insulated from the object through which the stud passes by a coating of paint, Teflon, etc. on either or between both. Also, the stud could be attached directly to a metallic object for the later attachment of a metallic or non-metallic object to the stud. Furthermore, although the retaining ring 34 has been described in terms of a metallic element, this could be made of a non-metallic substance, such as plastic, provided, however, that the ring retainer would be capable of fusing away or softening within the desired period of time. Although the specific description above refers to a time of approximately two-tenths of a second, obviously, this time will vary depending upon the size of the stud, the amount of current, etc. For example, if the welding current were increased, the time for welding should decrease and this should be taken into consideration in determining the size and thickness of the retaining ring and the fingers thereon. In this regard, the ring retainer could actually be described as a "timer."

No special circuitry has been shown for the welding gun 16 because any conventional power supply could be employed for providing a current of the required strength and duration. For example, any desired adjustment could be provided by varying the amperage setting on the control. If desired, the trigger could be the means solely for initiating the current pulse after which some timing device (not shown) in the circuit could be used to cut off the current. If the operator were sufficiently skilled, the automatic timing circuit could be eliminated with the end of the current pulse being determined by the release of the trigger.

Whereas the present invention has been described in particular relation to the drawings attached hereto, it should be understood that other and further modifications, apart from those shown or suggested herein, may be made within the spirit and scope of this invention.

What is claimed is:

1. A method of welding an electrically conductive stud to an electrically conductive metallic object which comprises reducing the cross sectional area of the stud tip in the region designed to contact the metallic object, locking the stud in position against the metallic object by means of a fusible retaining means, supporting said fusible retaining means in spaced relation with respect to said metallic object by a non-fusible arc shield, engaging the other end of said stud opposite from said tip with a stud gun, simultaneously applying a manual force against said stud in the direction of said metallic object and directing a current of predetermined duration through said stud and into said metallic object, the current causing the tip to burn away and start an arc thereby creating an intense heat in the region of said arc, the heat of said arc melting said fusible retaining means and creating molten metal in the region of said arc, continuing the application of manual force in the direction of said metallic object to force said stud beyond the influence of said retaining means and forcing the stud into said molten metal.

2. The method of welding as set forth in claim 1 including the step of shielding said arc in the region of the tip of said stud.

3. Apparatus for welding a metallic stud to a metallic object comprising a stud having a head at one end thereof, a stud tip of reduced cross sectional area at the opposite end of said stud and adapted to bear against said metallic object, a fusible retaining member adapted to engage said stud adjacent said stud tip so as to hold said stud in a relatively fixed position with respect to said metallic object, non-fusible arc-shield means supporting said fusible retaining member in spaced relation with respect to said metallic object, means for simultaneously applying a manual force said stud in the direction of said metallic object and directing a current of predetermined duration through said stud and into said metallic object so as to melt said stud tip and the portion of said retaining means which holds said stud in said fixed position, whereby the continued application of force from said force applying means forces said stud beyond the influence of said retaining means and into the molten metal created by the melting of said tip.

4. Welding apparatus as set forth in claim 3 wherein said stud is provided with a circumferential groove and said retaining means is provided with a plurality of radially inwardly directed fingers received in said groove and wherein said means for supporting said retaining member is a ring-shaped arc shield surrounding said tip and connected to said retaining means.

5. Welding apparatus as set forth in claim 3 wherein said head on said stud is a threaded nut threadedly engaging said stud and wherein said force applying means is a stud gun having an adapter with a suitably shaped recess therein to receive said nut and the adjacent end of said stud whereby, when said welding operation is completed, said adapter may be rotated so as to rotate said nut on said stud.

* * * * *

UNITED STATES PATENT OFFICE
CERTIFICATE OF CORRECTION

Patent No. 3,706,870     Dated December 19, 1972

Inventor(s) Robert A. Sauder; Gary R. Kendrick

It is certified that error appears in the above-identified patent and that said Letters Patent are hereby corrected as shown below:

Column 5, line 17, after the word "force" insert --against--.

Signed and sealed this 25th day of June 1974.

(SEAL)
Attest:

EDWARD M. FLETCHER, JR.
Attesting Officer

C. MARSHALL DANN
Commissioner of Patents